US008886901B1

(12) United States Patent
Hsu et al.

(10) Patent No.: US 8,886,901 B1
(45) Date of Patent: Nov. 11, 2014

(54) POLICY BASED STORAGE TIERING

(75) Inventors: Windsor W. Hsu, San Jose, CA (US); Teng Xu, Santa Clara, CA (US)

(73) Assignee: EMC Corporation, Hopkinton, MA (US)

( * ) Notice: Subject to any disclaimer, the term of this patent is extended or adjusted under 35 U.S.C. 154(b) by 263 days.

(21) Appl. No.: 12/983,285

(22) Filed: Dec. 31, 2010

(51) Int. Cl.
G06F 12/16 (2006.01)
G06F 3/06 (2006.01)

(52) U.S. Cl.
CPC ............ G06F 3/0647 (2013.01); G06F 3/065 (2013.01)
USPC .......................................... 711/161; 711/165

(58) Field of Classification Search
CPC ........ G06F 3/0647; G06F 3/065; G06F 3/067
USPC .................................. 711/161, 165
See application file for complete search history.

(56) References Cited

U.S. PATENT DOCUMENTS

| | | | |
|---|---|---|---|
| 5,649,196 A | 7/1997 | Woodhill et al. | |
| 6,574,657 B1 | 6/2003 | Dickinson | |
| 6,928,526 B1 | 8/2005 | Zhu et al. | |
| 7,567,188 B1 | 7/2009 | Anglin et al. | |
| 7,584,338 B1 | 9/2009 | Bricker et al. | |
| 7,995,759 B1 | 8/2011 | Tolfmans | |
| 8,126,852 B1 | 2/2012 | Patterson | |
| 8,396,839 B1 | 3/2013 | Huang | |
| 8,412,848 B2 | 4/2013 | Therrien et al. | |
| 2003/0097359 A1 | 5/2003 | Ruediger | |
| 2005/0004954 A1 | 1/2005 | Soule, III | |
| 2005/0097150 A1 | 5/2005 | McKeon et al. | |
| 2007/0055583 A1 | 3/2007 | Davis | |
| 2008/0037587 A1 | 2/2008 | Roesch et al. | |
| 2008/0040503 A1 | 2/2008 | Kleks et al. | |
| 2008/0082770 A1 | 4/2008 | Ahal et al. | |
| 2008/0155192 A1 | 6/2008 | Iitsuka | |
| 2008/0256143 A1 | 10/2008 | Reddy et al. | |
| 2008/0256326 A1 | 10/2008 | Patterson et al. | |
| 2009/0083563 A1 | 3/2009 | Murase | |
| 2009/0204649 A1 | 8/2009 | Wong et al. | |
| 2009/0204650 A1* | 8/2009 | Wong et al. .................... 707/204 |
| 2009/0276647 A1 | 11/2009 | Boyd | |
| 2009/0292746 A1* | 11/2009 | Bricker et al. ................ 707/204 |
| 2009/0313248 A1 | 12/2009 | Balachandran et al. | |
| 2010/0088349 A1 | 4/2010 | Parab | |
| 2010/0094817 A1 | 4/2010 | Ben-Shaul et al. | |
| 2010/0125553 A1 | 5/2010 | Huang et al. | |
| 2010/0161608 A1 | 6/2010 | Jain et al. | |
| 2010/0199065 A1 | 8/2010 | Kaneda | |
| 2010/0205158 A1 | 8/2010 | Dybas | |
| 2010/0223441 A1 | 9/2010 | Lillibridge et al. | |
| 2010/0299311 A1 | 11/2010 | Anglin et al. | |
| 2010/0306176 A1 | 12/2010 | Johnson et al. | |
| 2010/0332401 A1 | 12/2010 | Prahlad et al. | |
| 2010/0332452 A1* | 12/2010 | Hsu et al. ...................... 707/640 |

(Continued)

Primary Examiner — Than Nguyen
(74) Attorney, Agent, or Firm — Van Pelt, Yi & James LLP

(57) ABSTRACT

A method, article of manufacture, and apparatus for transferring data from a source tier to a target tier. In some embodiments, this may include applying a policy to an object in the source tier, determining the target tier based on the policy, and moving the object from the source tier to the target tier based on the policy. In some embodiments, determining the target tier based on the policy may include determining a higher target tier. In some embodiments, determining the target tier based on the policy may include determining a lower target tier.

24 Claims, 4 Drawing Sheets

(56) References Cited

U.S. PATENT DOCUMENTS

| | | |
|---|---|---|
| 2010/0333116 A1* | 12/2010 | Prahlad et al. ............... 719/328 |
| 2011/0016095 A1 | 1/2011 | Anglin et al. |
| 2011/0071980 A1 | 3/2011 | Patterson |
| 2011/0078112 A1 | 3/2011 | Takata et al. |
| 2011/0145207 A1 | 6/2011 | Agrawal et al. |
| 2011/0153965 A1* | 6/2011 | Haustein et al. ............. 711/162 |
| 2011/0218969 A1 | 9/2011 | Anglin et al. |
| 2011/0246431 A1 | 10/2011 | Iitsuka |
| 2011/0307456 A1 | 12/2011 | Jayaraman et al. |
| 2011/0307659 A1* | 12/2011 | Hans et al. .................... 711/114 |
| 2012/0023292 A1* | 1/2012 | Saito et al. .................... 711/114 |
| 2012/0036327 A1* | 2/2012 | Jennas et al. .................. 711/137 |
| 2012/0059994 A1* | 3/2012 | Montgomery et al. ....... 711/119 |
| 2012/0084527 A1* | 4/2012 | Jayaraman et al. ........... 711/165 |
| 2012/0089578 A1 | 4/2012 | Lam |
| 2012/0095968 A1* | 4/2012 | Gold .............................. 707/652 |
| 2012/0143832 A1 | 6/2012 | Aronovich et al. |
| 2012/0151169 A1* | 6/2012 | Mori et al. .................... 711/166 |
| 2012/0221783 A1* | 8/2012 | Yamamoto et al. ........... 711/103 |
| 2012/0239864 A1* | 9/2012 | Montgomery et al. ....... 711/103 |
| 2012/0254546 A1* | 10/2012 | Montgomery et al. ....... 711/130 |
| 2012/0272026 A1* | 10/2012 | Montgomery .................. 711/162 |
| 2013/0007401 A1 | 1/2013 | Asaki et al. |

\* cited by examiner

POLICY BASED STORAGE TIERING

CROSS REFERENCE TO RELATED APPLICATIONS

This application is related to co-pending U.S. patent application Ser. No. 12/983,281 for EFFICIENT STORAGE TIERING and filed concurrently herewith, which is incorporated herein by reference for all purposes; and to co-pending U.S. patent application Ser. No. 12/983,282 for STORAGE TIERING WITH SIMILAR SEGMENTS and filed concurrently herewith, which is incorporated herein by reference for all purposes.

FIELD OF THE INVENTION

The present invention relates generally to data systems, and more particularly, to systems and methods of storing data.

BACKGROUND OF THE INVENTION

A typical data system may have multiple tiers of storage. Higher tier storage devices may include high performance disks that provide faster access times and other benefits. Lower tier storage devices may include generic disks that are able to store data cheaply.

Tieiring storage generally enhances the efficiency of data systems. For example, not all files are accessed frequently. Files that are accessed frequently may be stored on higher tier storage to allow for quick access. Files that are accessed infrequently may be stored on lower tier storage for economic reasons.

Deduplication may further enhance the efficiency of data systems. Deduplication generally involves storing only a single instance of data, or a segment of data. Since many files may share common data segments, performing deduplication on one or more tiers of storage may potentially result in substantial disk savings.

Files typically do not stay in the same tier for prolonged periods of time. Some files may lose importance, causing them to be moved to a lower tier storage. Similarly, some files may gain importance, causing them to be moved to a higher tier storage. Unfortunately, moving files, or data, between different tiers involves moving the whole file or data. This results in the loss of efficiency provided by deduplication.

There is a need, therefore, for an improved method, article of manufacture, and apparatus for protecting and accessing data in data systems.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
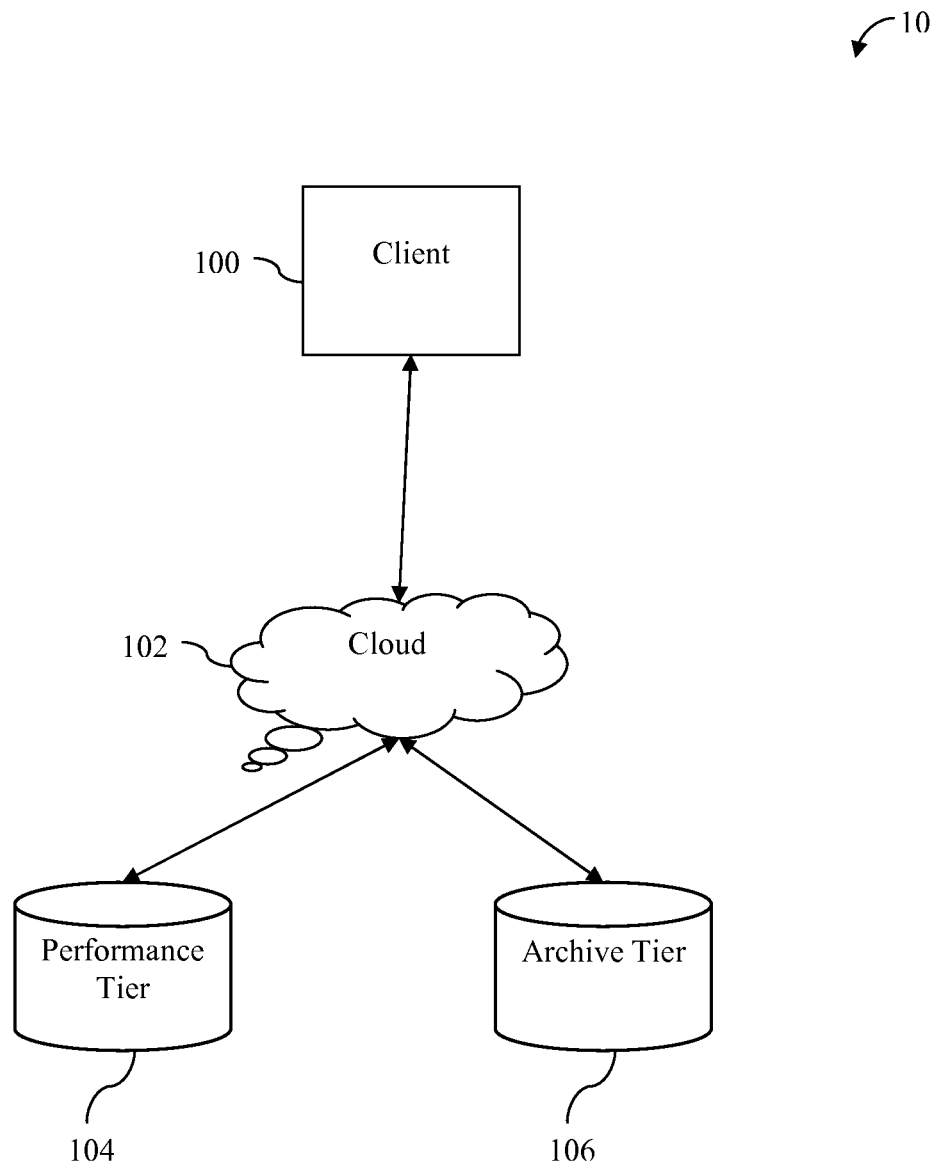
FIG. 1 is a diagram of a data system in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a data system configured to store files, but it should be understood that the principles of the invention are not limited to data systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Conventional data systems typically use tiering to differentiate data based on storage requirements, such as performance and availability, among others. Data is stored on a tier that is appropriate and least expensive. Storage costs are typically reduced by using space reduction, such as deduplication and compression, among others. Moving files in conventional data systems typically is an expensive operation. This typically involves reading data from a first tier, and writing the file on a second tier. These moves typically lose the benefit of space reduction techniques, and depending on the size of the file, may take a considerable amount of resources, such as network bandwidth and server processing capacity, among others. The enhanced techniques described herein allow for data to be moved from one tier to another while maintaining the benefits of space reduction techniques.

FIG. 1 illustrates a data system in accordance with some embodiments. Data System 10 contains Client 100, Cloud 102, Performance Tier 104, and Archive Tier 106. Client 100 access data stored on either Performance Tier 104 or Archive Tier 106 via Cloud 102. Performance Tier 104 contains equipment that (e.g. disk drives, network equipment, processors, etc.) is optimized for performance and availability. Archive Tier 106 contains equipment that is optimized for storing data economically. Cloud 102 is a medium (e.g. the internet, corporate intranet, etc.) through which Client 100 connects to Performance Tier 104 and Archive Tier 106.

Though FIG. 1 illustrates one client, a cloud, and two tiers, it should be noted the enhanced techniques described herein are equally applicable to a wide variety of data systems. For example, multiple clients may connect to a single storage tier directly (e.g. no internet or network). Multiple clients may also connect to several storage tiers. In some embodiments, a first storage tier may be directly connected to a second storage tier, and the client may not be aware of the second storage tier.

Performance Tier 104 and Archive Tier 106 may each be deduplicated in some embodiments. To illustrate, suppose File A is made up of Segments 1, 2, and 3, File B is made up of Segments 3, 4 and 5, and File C is made up of Segments 1, 3, and 5. Further suppose that Files A and B were stored on Performance Tier 104, and File C was stored on Archive Tier 106. Performance Tier 104 would only have one copy of Segments 1, 2, 3, 4, and 5, instead of Segments 1, 2, 3, 3 (duplicate), 4 and 5, while Archive Tier 106 would have Segments 1, 3 and 5. If File A were to be moved to Archive Tier 106 (may be due to losing importance, inactivity, etc.), it could be determined that Archive Tier 106 already has Segments 1 and 3. In this way, only Segment 2 needs to be transferred from Performance Tier 104 to Archive Tier 106, instead of Segments 1, 2, 3. The benefits of deduplication are maintained while moving File A to Archive Tier 106.

Figure 2:
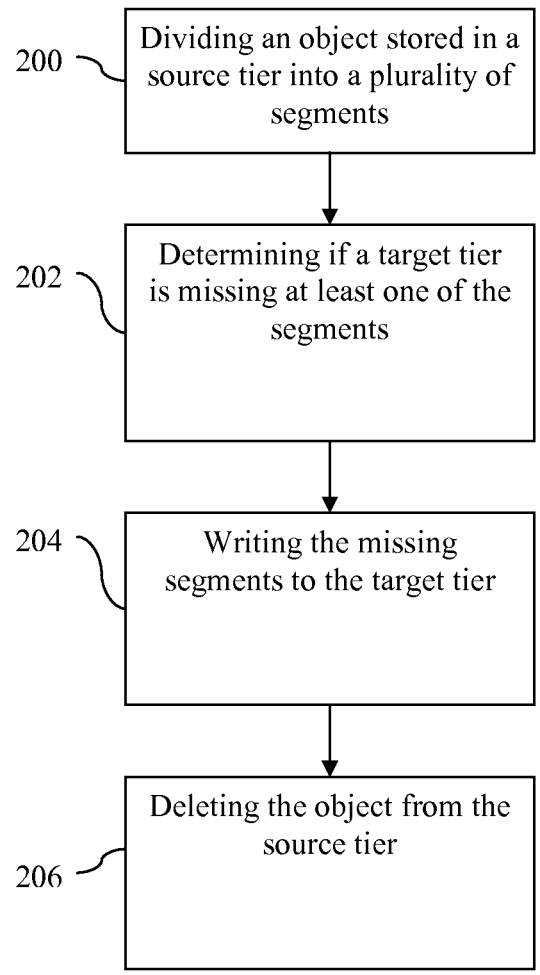
FIG. 2 is a flowchart of a method to transfer data from a source tier to target tier in accordance with some embodiments.

FIG. 2 illustrates a method to transfer data from a source tier to target tier in accordance with some embodiments. In step 200, an object stored in a source tier is divided into a plurality of segments. In step 202, it is determined if a target tier is missing at least one of the segments It should be noted that the entire plurality of segments may not be in the target tier, at least one of the plurality of segments may be in the target tier, or the entire plurality of segments may be in the target tier. In step 204, the missing segments are sent or written to the target tier. This may be 0 segments, each of the plurality of segments, or at least one of the plurality of segments. In step 206, the object is deleted from the source tier.

Metadata may be updated to indicate that a file has been moved from the source tier to the target tier. In some embodiments, updating the metadata may include checking if the file has been changed (e.g. deleted, updated, etc.) in the source tier since the file was written to the target tier, and updating the metadata only if the file has not been changed.

A segment index may be used to determine whether a segment already exists in a target. For example, if Archive Tier 106 had File C, its segment index would indicate Segments 1, 3 and 5. When moving files to Archive Tier 106, the index would be compared to the segments needed to move the files. If a segment needed to move the files appeared on the segment index, the transfer of the segment could be skipped.

In some embodiments, an identifier, or fingerprint, may be assigned to a segment based on the content of the segment (e.g. a hash value). A segment index may also use the fingerprint to index the fingerprint's associated segment. In some embodiments, checking whether the target tier already contains a segment may be accomplished by sending the fingerprints of the segments to the target tier, and looking up the segment index of the target tier for each of the fingerprints.

In some embodiments, it may be preferable to verify that the file was properly written to the target tier. For example, verification may include reading the file, computing the checksum, and comparing it with the checksum of the file stored in the source tier. Once the file has been verified, the file may be deleted from the source tier.

Policies may be used to select which files need to be moved to a different tier, and which tier to move the files to if such a move is required. For example, a policy may dictate that files of a certain type that have not been modified or accessed for an amount of time should be moved to a lower tier. Similarly, a policy may dictate that files of a certain user accessed frequently should be moved to a higher tier.

Files may be segmented in a variety of ways. For example, in some embodiments, a file may be divided into segments based on the content of the file by applying a hash function to the file.

In some embodiments, a segment similar to a segment in a source tier may reside in a target tier. Determining whether the target tier contains the segment in the source tier may include identifying the similar segment in the target tier, adding a reference to the similar segment, and storing the difference between the segment and the similar segment in the target tier.

In some embodiments, the source tier and the target tier may utilize different deduplication techniques or compression methods. For example, the source tier may divide files into 1 MB segments, while the target tier may divide files into 2 MB segments. In these cases, a file in the source tier may be re-segmented using the technique utilized by the target tier. The source tier may then be compared to the target tier, and if any of the segments on the source tier (segments created by the technique utilized by the target tier) are not in the target tier, those segments are transferred to the target tier. The source tier need not store the segments created by the technique utilized by the target tier.

In some embodiments, segments may be stored compressed in the source tier, and may be sent to the target tier in the compressed format. Various compression algorithms may be used, such as Lempel-Ziv algorithm, among others. Similar to the above, the source tier and the target tier may utilize different compression algorithms. In such cases, sending a segment to the target tier may include decompressing the segment using the source tier compression algorithm, and recompressing the segment using the target tier compression algorithm.

Figure 3:
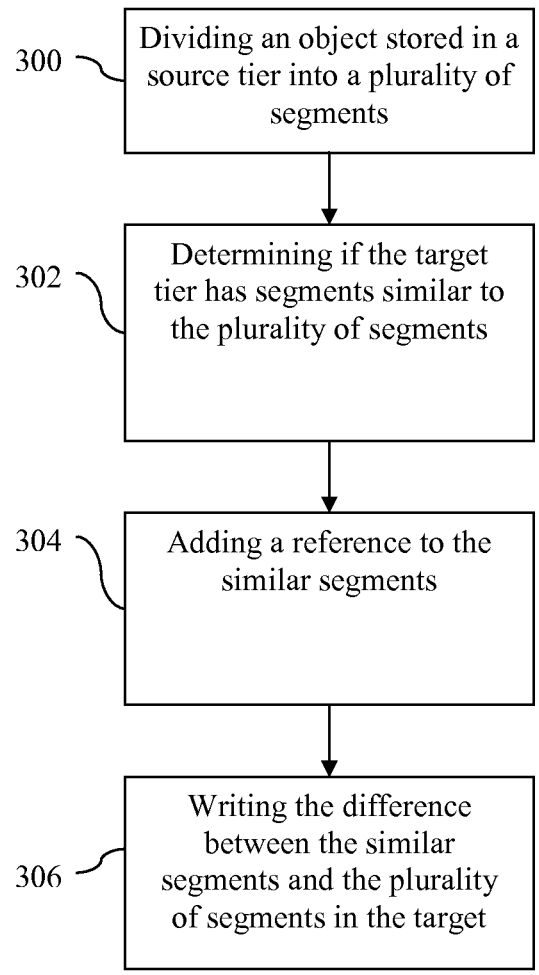
FIG. 3 is a flowchart of a method to transfer data from a source tier to target tier in accordance with some embodiments.

FIG. 3 illustrates a method to transfer data from a source tier to a target tier in accordance with some embodiments. In step 300, an object stored in a source tier is divided into a plurality of segments. In step 302, it is determined if the target tier has segments similar to the plurality of segments. In step 304, a reference is added to the similar segments. In step 306, the difference between the similar segments and the plurality of segments is written in the target.

Figure 4:
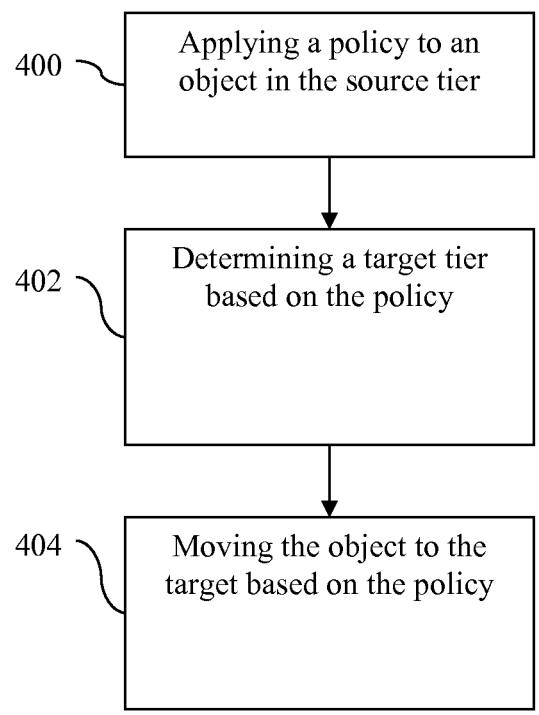
FIG. 4 is a flowchart of a method to transfer data from a source tier to target tier in accordance with some embodiments.

FIG. 4 illustrates a method to transfer data from a source tier to a target tier in accordance with some embodiments. In step 400, a policy is applied to an object in the source tier. In step 402, a target tier is determined based on the policy. In step 404, the object is moved to the target based on the policy.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for transferring data from a source tier to a target tier, comprising:
    applying a policy to select a first object in the source tier to transfer to the target tier, wherein the first object is associated with a first user, and wherein the policy indicates the selection of objects of the first user for transfer to the target tier based at least in part on an access rate associated with each of at least some of the objects of the first user;
    determining to move a first segment comprising the first object to the target tier based at least in part on a determination that the target tier has not already stored the first segment; and
    moving, in response to the determination to move, the first segment comprising the first object from the source tier to the target tier.

2. The method as recited in claim 1, further comprising applying the policy to not select a second object in the source tier to transfer to the target tier, wherein the second object is associated with a second user, and wherein the policy further indicates not selecting frequently accessed objects of the second user to transfer to the target tier.

3. The method as recited in claim 1, further comprising applying the policy to determine that the target tier to transfer the first object to comprises a higher tier relative to the source tier.

4. The method as recited in claim 1, further comprising applying the policy to determine that the target tier to transfer the first object to comprises a lower tier relative to the source tier.

5. The method as recited in claim 1, wherein the policy is further based at least in part on an amount of time since the first object was last accessed and a time threshold associated with a type of the first object.

6. The method as recited in claim 1, wherein the first object further comprises second segment, wherein the determination to move includes determining that the target tier has already stored a segment that is identical to the second segment, and wherein the second segment is not moved from the source tier to the target tier.

7. The method as recited in claim 1, further comprising verifying that the first object is properly moved to the target tier.

8. The method as recited in claim 7, wherein the verification includes reading the first object at the target tier, computing a checksum, and comparing the checksum with a checksum of the first object stored in the source tier.

9. A system for transferring data, comprising a source tier, a target tier, and a processor configured to:
    apply a policy to select a first object in the source tier to transfer to the target tier, wherein the first object is associated with a first user, and wherein the policy indicates the selection of objects of the first user for transfer to the target tier based at least in part on an access rate associated with each of at least some of the objects of the first user;
    determine to move a first segment comprising the first object to the target tier based at least in part on a determination that the target tier has not already stored the first segment; and
    move, in response to the determination to move, the first segment comprising the first object from the source tier to the target tier.

10. The system as recited in claim 9, further comprising applying the policy to not select a second object in the source tier to transfer to the target tier, wherein the second object is associated with a second user, and wherein the policy further indicates not selecting frequently accessed objects of the second user to transfer to the target tier.

11. The system as recited in claim 9, further comprising applying the policy to determine that the target tier to transfer the first object to comprises a higher tier relative to the source tier.

12. The system as recited in claim 9, further comprising applying the policy to determine that the target tier to transfer the first object to comprises a lower tier relative to the source tier.

13. The system as recited in claim 9, wherein the policy is further based at least in part on an amount of time since the first object was last accessed and a time threshold associated with a type of the first object.

14. The system as recited in claim 9, wherein the first object further comprises second segment, wherein the determination to move includes determining that the target tier has already stored a segment that is identical to the second segment, and wherein the second segment is not moved from the source tier to the target tier.

15. The system as recited in claim 9, further comprising verifying that the first object is properly moved to the target tier.

16. The system as recited in claim 15, wherein the verification includes reading the first object at the target tier, computing a checksum, and comparing the checksum with a checksum of the first object stored in the source tier.

17. A computer program product for transferring data from a source tier to a target tier, comprising a non-transitory computer usable medium having machine readable code embodied therein for:

applying a policy to select a first object in the source tier to transfer to the target tier, wherein the first object is associated with a first user, and wherein the policy indicates the selection of objects of the first user for transfer to the target tier based at least in part on an access rate associated with each of at least some of the objects of the first user;

determining to move a first segment comprising the first object to the target tier based at least in part on a determination that the target tier has not already stored the first segment; and moving, in response to the determination to move, the first segment comprising the first object from the source tier to the target tier.

18. The computer program product as recited in claim 17, further comprising applying the policy to not select a second object in the source tier to transfer to the target tier, wherein the second object is associated with a second user, and wherein the policy further indicates not selecting frequently accessed objects of the second user to transfer to the target tier.

19. The computer program product as recited in claim 17, further comprising applying the policy to determine that the target tier to transfer the first object to comprises a higher tier relative to the source tier.

20. The computer program product as recited in claim 17, further comprising applying the policy to determine that the target tier to transfer the first object to comprises a lower tier relative to the source tier.

21. The computer program product as recited in claim 17, wherein the policy is further based at least in part on an amount of time since the first object was last accessed and a time threshold associated with a type of the first object.

22. The computer program product as recited in claim 17, wherein the first object further comprises second segment, wherein the determination to move includes determining that the target tier has already stored a segment that is identical to the second segment, and wherein the second segment is not moved from the source tier to the target tier.

23. The computer program product as recited in claim 17, further comprising verifying that the first object is properly moved to the target tier.

24. The computer program product as recited in claim 23, wherein the verification includes reading the first object at the target tier, computing a checksum, and comparing the checksum with a checksum of the first object stored in the source tier.

* * * * *